(12) United States Patent
Saito

(10) Patent No.: US 7,243,895 B2
(45) Date of Patent: Jul. 17, 2007

(54) DAMPING AND MOUNTING STRUCTURE FOR A MOTOR

(75) Inventor: Noboru Saito, Saitama (JP)

(73) Assignee: PENTAX Corporation, Tokyo (JP)

( * ) Notice: Subject to any disclaimer, the term of this patent is extended or adjusted under 35 U.S.C. 154(b) by 148 days.

(21) Appl. No.: 11/049,673

(22) Filed: Feb. 4, 2005

(65) Prior Publication Data

US 2005/0179180 A1    Aug. 18, 2005

(30) Foreign Application Priority Data

Feb. 6, 2004    (JP)    ............................... 2004-30932

(51) Int. Cl.
*F16M 1/00*    (2006.01)
(52) U.S. Cl. ........................ 248/638; 248/564; 248/562
(58) Field of Classification Search ................ 248/638, 248/636, 562, 564, 568, 569, 570, 673, 674
See application file for complete search history.

(56) References Cited

U.S. PATENT DOCUMENTS

| | | | | | |
|---|---|---|---|---|---|
| 1,951,217 | A | * | 3/1934 | Slocum | ........................ 52/402 |
| 3,039,831 | A | * | 6/1962 | Thomas | ....................... 384/222 |
| 3,730,462 | A | * | 5/1973 | Dick | ........................ 267/140.2 |
| 3,747,879 | A | * | 7/1973 | Houk | .......................... 248/609 |
| 3,909,335 | A | * | 9/1975 | Jellison | ....................... 156/396 |
| 4,183,496 | A | * | 1/1980 | Brock et al. | ................. 248/638 |
| 4,296,839 | A | * | 10/1981 | Peller et al. | ................. 188/378 |
| 4,340,955 | A | * | 7/1982 | Elliott | ......................... 369/213 |
| 4,356,904 | A | * | 11/1982 | Siarto | ...................... 198/345.3 |
| 4,452,417 | A | * | 6/1984 | Krafthefer et al. | ........... 248/604 |
| 4,682,753 | A | * | 7/1987 | Clark | ...................... 267/140.13 |
| 4,693,456 | A | * | 9/1987 | Kanda | .................... 267/140.12 |
| 4,744,677 | A | * | 5/1988 | Tanaka et al. | ............... 384/222 |
| 5,017,328 | A | * | 5/1991 | Mazurek | ...................... 267/136 |
| 5,080,334 | A | * | 1/1992 | Mihara et al. | ............... 267/276 |
| 5,088,701 | A | * | 2/1992 | Nanno | .................... 267/140.12 |
| 5,111,227 | A | | 5/1992 | Ogawa | |

(Continued)

FOREIGN PATENT DOCUMENTS

JP    5-342837    12/1993

(Continued)

OTHER PUBLICATIONS

English Language Abstract of JP-001438.

*Primary Examiner*—Ramon O. Ramirez
*Assistant Examiner*—Bradley Duckworth
(74) *Attorney, Agent, or Firm*—Greenblum & Bernstein, P.L.C.

(57) ABSTRACT

A damping and mounting structure for a motor includes a bracket to which a motor is mounted, the bracket being provided with a plurality of through-holes; a housing having a driven element which is driven by the motor on the bracket; a plurality of threaded holes and positioning recesses coaxial to the threaded holes, provided in the housing; a plurality of cylindrical damper bushes made of an elastic material, mounted in the through-holes; a plurality of retainer bushes made of a material harder than the damper bushes and inserted in the damper bushes, the retainer bushes being provided, at the front ends thereof, with positioning projections which are inserted into the positioning recesses; and a plurality of set screws which extend through the retainer bushes from a surface of the bracket and are screwed into the threaded holes of the housing.

5 Claims, 6 Drawing Sheets

U.S. PATENT DOCUMENTS

| | | | | |
|---|---|---|---|---|
| 5,193,355 A | * | 3/1993 | Matsumi | 62/262 |
| 5,323,211 A | * | 6/1994 | Fujii et al. | 399/167 |
| 5,349,475 A | | 9/1994 | Nomura et al. | |
| 5,489,086 A | * | 2/1996 | Kanda | 267/140.12 |
| 5,671,908 A | * | 9/1997 | Kato | 267/140.12 |
| 5,690,320 A | * | 11/1997 | Kanda | 267/140.12 |
| 5,769,380 A | * | 6/1998 | Hibi et al. | 267/141.2 |
| 5,799,923 A | * | 9/1998 | Carr et al. | 248/635 |
| 5,820,115 A | * | 10/1998 | Stevenson et al. | 267/293 |
| 5,927,407 A | * | 7/1999 | Gwinn et al. | 173/162.2 |
| 6,023,937 A | * | 2/2000 | Rodrigues | 62/295 |
| 6,029,942 A | * | 2/2000 | Daddis et al. | 248/635 |
| 6,138,980 A | * | 10/2000 | Farbotnik | 248/638 |
| 6,216,833 B1 | * | 4/2001 | Lefferts et al. | 188/380 |
| 6,345,966 B1 | * | 2/2002 | Hahn et al. | 418/55.1 |
| 6,354,558 B1 | * | 3/2002 | Li | 248/615 |
| 6,565,061 B1 | * | 5/2003 | Petersen et al. | 248/638 |
| 2002/0043749 A1 | * | 4/2002 | Hokazono et al. | 267/140.12 |
| 2004/0197136 A1 | * | 10/2004 | Emin | 403/280 |

FOREIGN PATENT DOCUMENTS

JP        7-001438        1/1995

* cited by examiner

DAMPING AND MOUNTING STRUCTURE FOR A MOTOR

BACKGROUND OF THE INVENTION

1. Field of the Invention

The present invention relates to a structure for mounting a motor to a housing having a driven element which is driven by the motor, and more specifically, relates to a motor damping and mounting structure in which the amount of vibration of the motor transmitted to the housing can be minimized and the mounting position of the motor to the housing can be precisely determined.

2. Description of the Related Art

In a known optical device or electronic device having a motor incorporated therein, vibration produced when the motor is driven causes various problems. For instance, in a digital camera having a motion picture photographing function or a sound recording function, in which a drive motor is provided in a camera body to carry out the zooming or focusing operation, the precision of the motion picture photographing operation is affected or unwanted noise is recorded due to motor vibration. Furthermore, electronic circuitry provided in the digital camera can be damaged due to the motor vibration.

In order to prevent vibration of the motor from being transmitted to the housing or casing of the device as much as possible, in a known motor damping and mounting structure, a plurality of through-holes are formed in a bracket to which the motor is mounted, and damper bushes made of an elastic material are fitted in the through-holes so that set screws are inserted from the bracket surface in the damper bushes and are screwed in threaded holes formed in the housing of the device.

However, in such a known motor damping and mounting structure, the set screws and the damper bushes (i.e., the bracket and the housing) are relatively movable within the range of the elastic deformation of the damper bushes. Therefore, it is difficult to precisely determine the position of the bracket to which the motor is secured (and hence, it is difficult to precisely determine the position of the motor) and to secure the motor to the housing at a correct position. In other words, the known damping and mounting structure cannot be used for an arrangement in which the motor on the bracket and the elements driven by the motor must be precisely positioned and secured.

SUMMARY OF THE INVENTION

The present invention provides a damping and mounting structure for a motor in which the motor can be precisely mounted to a housing so that a minimum amount of motor vibration is transmitted to the housing.

According to an aspect of the present invention, a damping and mounting structure for a motor is provided, including a bracket to which a motor is mounted, the bracket being provided with a plurality of through-holes; a housing having a driven element which is driven by the motor on the bracket; a plurality of threaded holes and positioning recesses coaxial to the threaded holes, provided in the housing; a plurality of cylindrical damper bushes made of an elastic material, mounted in the through-holes; a plurality of retainer bushes made of a material harder than the damper bushes and inserted in the damper bushes, the retainer bushes being provided, at the front ends thereof, with positioning projections which are inserted into the positioning recesses; and a plurality of set screws which extend through the retainer bushes from a surface of the bracket and are screwed into the threaded holes of the housing.

It is desirable for each of the retainer bushes to include an outer projection, which defines the positioning projection; an inner fitting portion which is fitted in a corresponding the cylindrical damper bush; and a flange formed between the outer projection and the inner fitting portion to abut against a surface of the housing.

It is desirable for a fitting clearance between one of the positioning projections and a corresponding one of the positioning recesses to be different from a fitting clearance between all other the positioning projections and a corresponding all other the positioning recesses.

It is desirable for the bracket to be provided with three through-holes and for the damping and mounting structure to include three damper bushes and three retainer bushes, the positioning projection of one of the retainer bushes at the front end thereof and the corresponding positioning recess being non-circular so as to be finely adjustable linearly in one direction without relative rotation, the remaining two retainer bushes and positioning recesses being circular in cross section, so that the fitting accuracy of one retainer bush of the remaining two retainer bushes and one positioning recess corresponding thereto is higher than that of the other retainer bush of the remaining two retainer bushes and the positioning recess corresponding thereto.

In an embodiment, a damping and mounting structure for a motor is provided, including a bracket to which a motor is mounted, the bracket being provided with through-holes; a housing having a driven element which is driven by the motor on the bracket; threaded holes and positioning recesses coaxial to the threaded holes, provided in the housing; damper bushes made of an elastic material, mounted in the through-holes; and set screws having positioning shaft portions which are inserted in the cylindrical positioning recesses, the set screws being inserted in the damper bushes from a surface of the bracket and are screwed in threaded holes.

In this embodiment, the diameter of the positioning shaft portions is larger than the diameter of threaded portions to be screwed in the threaded holes.

The present disclosure relates to subject matter contained in Japanese Patent Application No. 2004-30932 (filed on Feb. 6, 2004) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
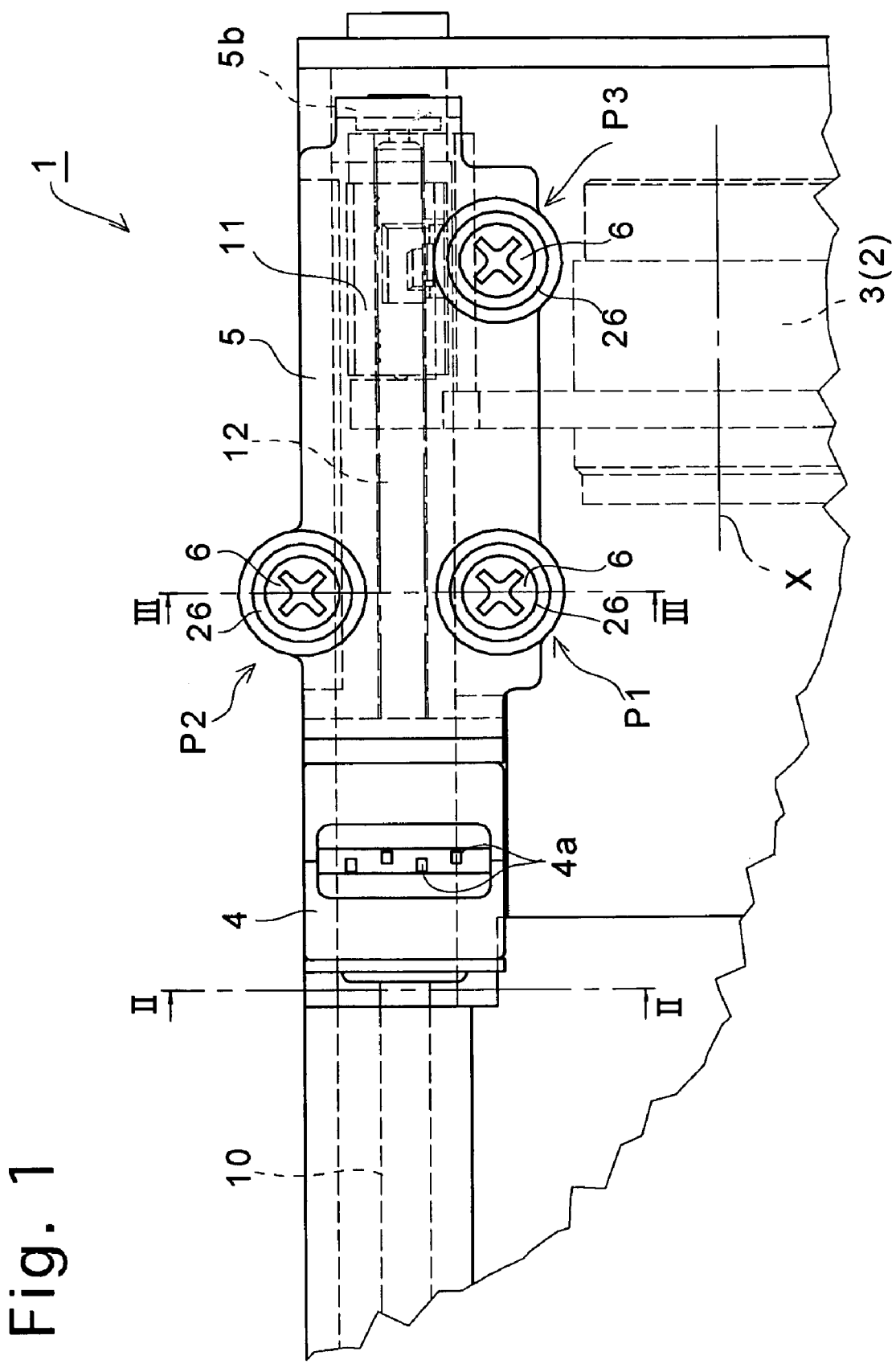
FIG. 1 is a front elevational view of an embodiment of a motor damping and mounting structure according to the present invention.

FIGS. 1 through 5 show a first embodiment of a motor damping and mounting structure according to the present invention, applied to a digital camera 1. The digital camera 1 has a motor 4 which moves a lens frame 3 which holds a lens 2 (FIGS. 2 and 3) in the direction of an optical axis X. The motor 4 is secured to a bracket 5. The bracket 5 is mounted to a housing (camera body) 9 by set screws 6.

The lens frame 3 is guided by a guide mechanism including a guide shaft 10 secured to the housing 9 so that the lens frame 3 slides in the optical axis direction without rotating. The lens frame 3 is provided with a rack 11, which is in mesh with a lead screw 12 connected to the motor 4, so that the rotation of the lead screw 12 is converted to a linear movement of the lens frame 3. The linear movement guide mechanism is per se known in the art.

Figure 2:
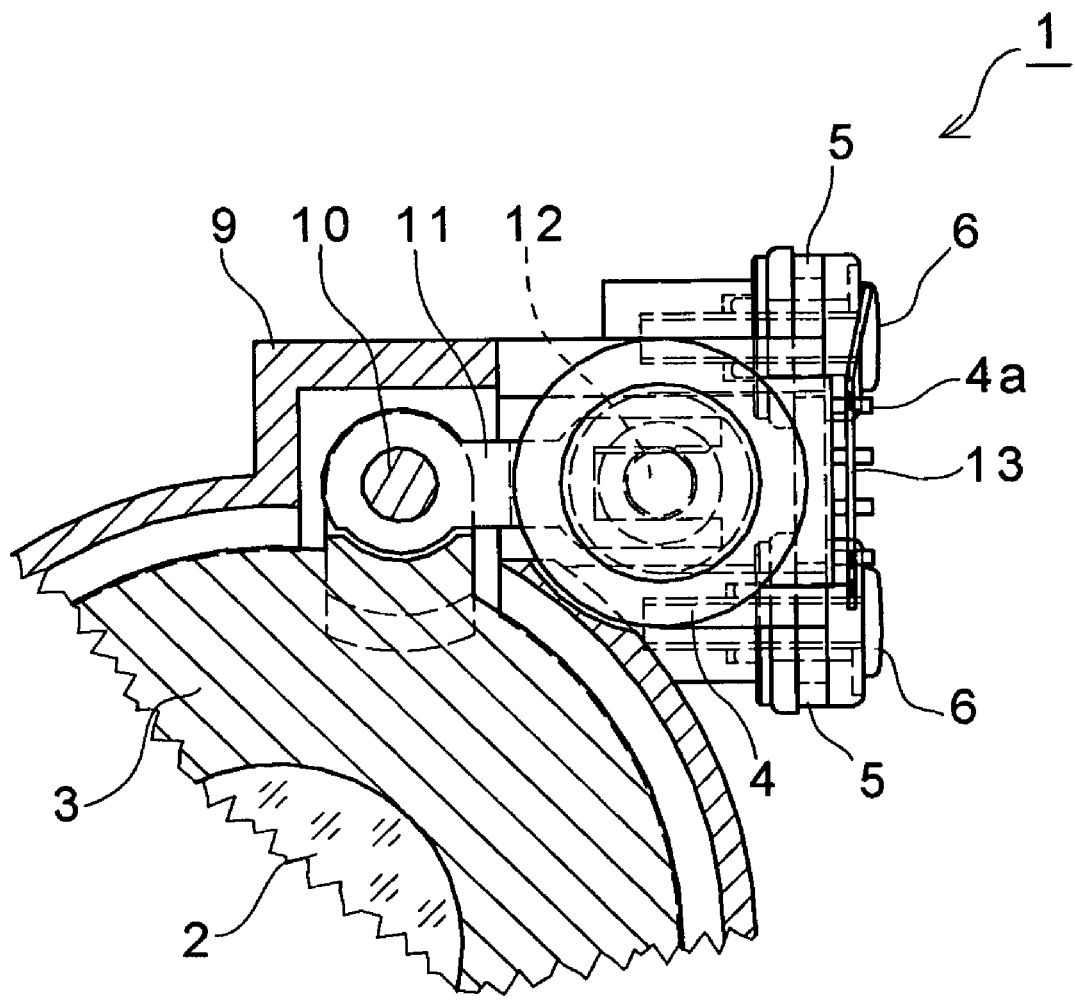
FIG. 2 is a sectional view taken along the line II—II in FIG. 1.
Figure 3:
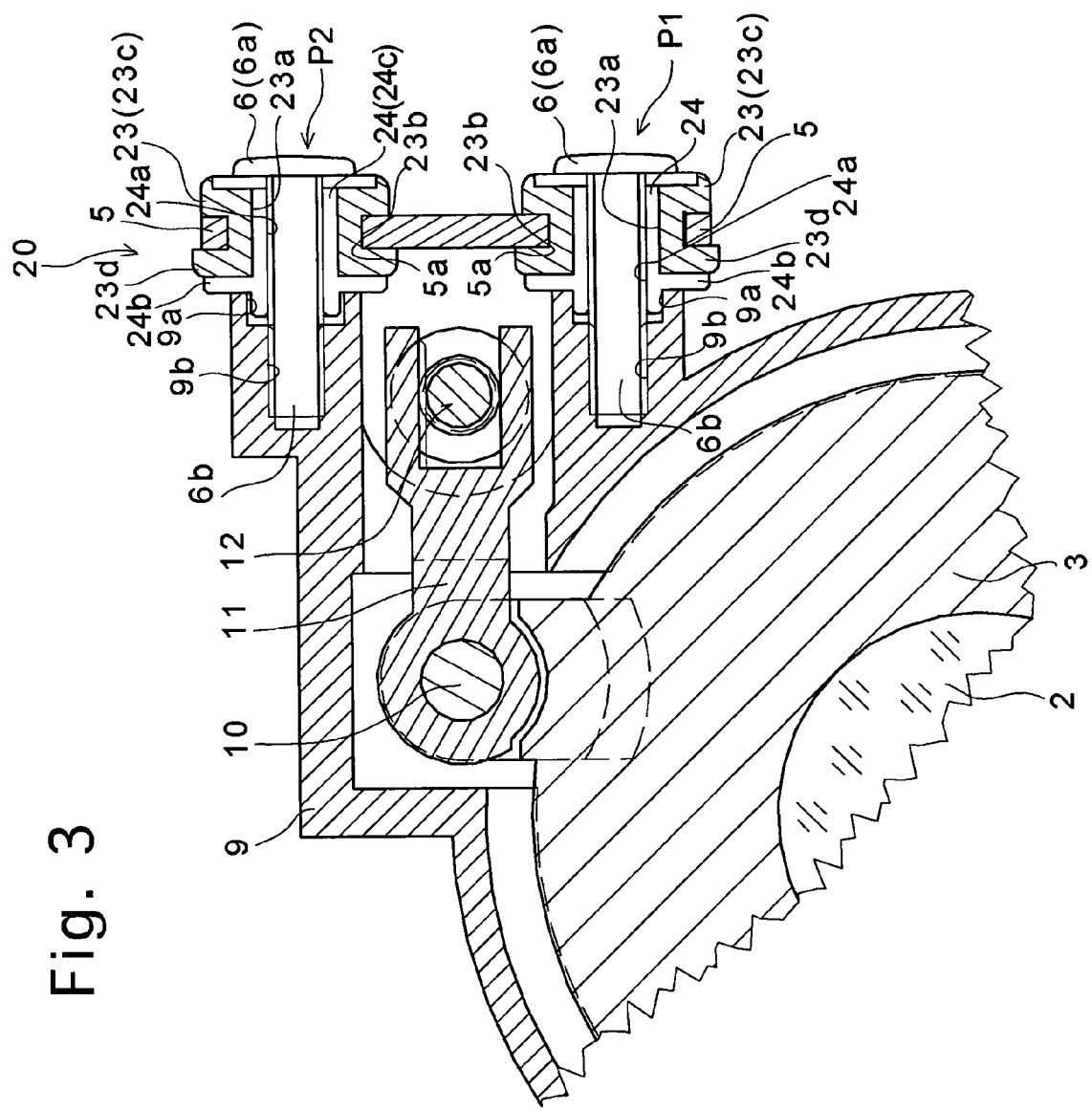
FIG. 3 is a sectional view taken along the line III—III in FIG. 1.
Figure 4:
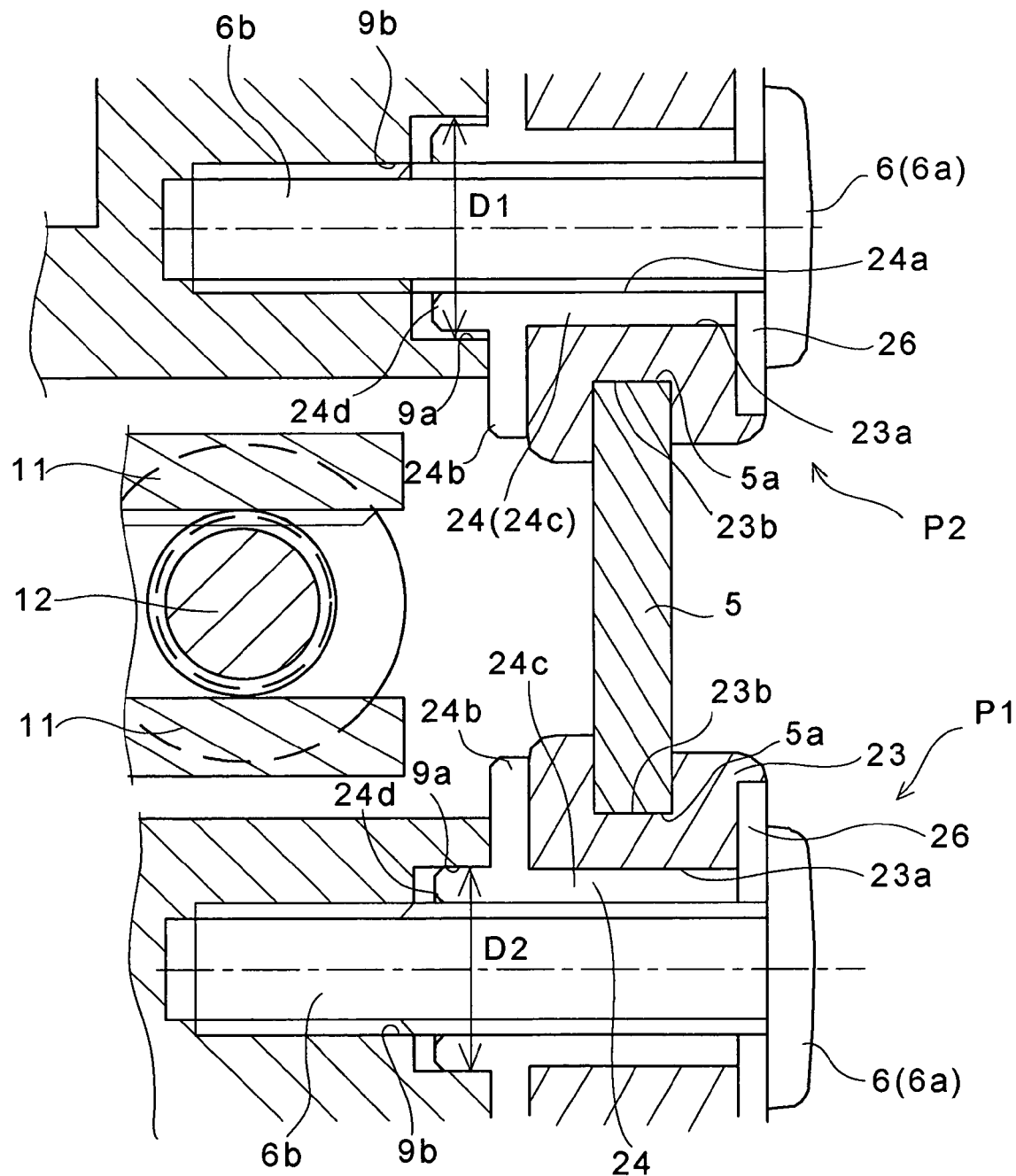
FIG. 4 is an enlarged partial view of FIG. 3.

The lead screw 12 is connected, at the base end thereof, to the rotating shaft of the motor 4 and is rotatably supported at the front end by side wall 5b of the bracket 5, as shown in FIG. 1. As can be seen in FIG. 2, the motor 4 is provided on its upper surface with a flexible printed circuit board 13 having an electronic circuit connected to a power supply terminal 4a of the motor 4 to control the motor 4.

The motor 4 is secured onto the metal bracket 5 in a predetermined position. The bracket 5 is secured to the housing 9 at three mounting points P1, P2 and P3, as shown in FIG. 1. The bracket 5 is provided with three through-holes 5a (FIG. 3) corresponding to the mounting points P1, P2 and P3.

The three mounting points P1, P2 and P3 are provided with damping and mounting structures 20 including cylindrical damper bushes (rubber bushes) 23 made of an elastic material inserted in the three through-holes 5a of the bracket 5, the retainer bushes 24 and the set screws 6a.

The cylindrical damper bush 23 made of a material having a damping function (vibration absorbing/eliminating function), such as rubber has an axial through-hole 23a and is provided on its outer peripheral surface with an annular groove 23b, in which the inner periphery of the through-hole 5a of the bracket 5 is engaged, and a pair of upper and lower flanges 23c and 23d that are located on opposite sides of the annular groove 23b. The cylindrical damper bush 23 can be formed separately from the through-hole 5a or can be formed integral with the bracket 5 by an outsert molding.

Figure 5:
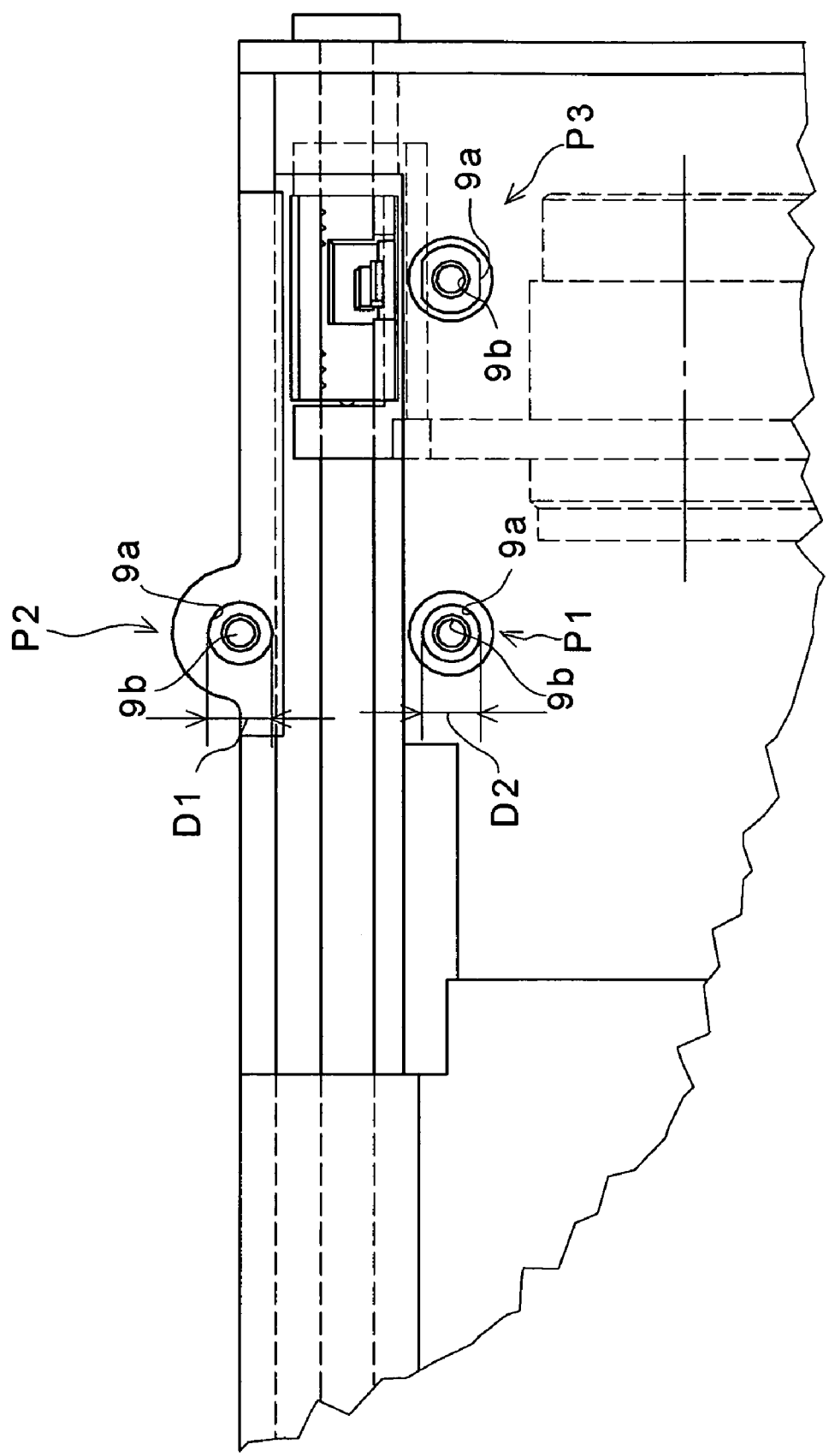
FIG. 5 is a front elevational view of a motor damping and mounting structure shown in FIG. 1, with a removed bracket.

The housing 9 is provided with positioning recesses 9a in which the retainer bushes 24 are fitted and threaded holes 9b in which the external threads 6b of the set screws 6 are screwed, corresponding to the three mounting points P1, P2 and P3. The positioning recesses 9a and the threaded holes 9b are arranged in that order from the front surface side. Among the three mounting portions, the positioning recesses 9a of the two mounting points P1 and P2 are circular in cross section, as shown in FIG. 5, and the diameter D1 (FIGS. 4 and 5) of the positioning recess 9a at the mounting point P2 is greater than the diameter D2 (FIGS. 4 and 5) of the positioning recess 9a at the mounting point P1. In contrast, the positioning recess 9a at the mounting point P3 has an inner wall of a non-circular shape defined by straight lines which are interconnected at the opposite ends by arcs (FIG. 5).

The retainer bush 24 is made of a material harder than the damper bush 23, such as synthetic resin or a metal. The retainer bush 24 is provided with a shaft portion with a through-hole 24a and is provided on the outer peripheral surface with a flange 24b. The flange 24b divides the retainer bush 24 into two parts, i.e., an inner fitting portion 24c which is fitted in the through-hole 23a of the damper bush and an outer projection (front end positioning projection) 24d which projects from the damper bush 23. The inner fitting portion 24c has an outer diameter which is slightly larger than the inner diameter of the through-hole 23a of the damper bush 23. Consequently, the through-hole 23a is elastically deformed when the inner fitting portion 24c is inserted in the through-hole 23a.

The shape of the outer projections 24d of the retainer bushes 24 corresponds to the shape of the positioning recesses 9a at the mounting points P1, P2 and P3. Namely, the outer projections 24d of the retainer bushes 24 at the mounting portions P1 and P2 have the same cylindrical shape, and the clearance between the outer projection and the positioning recess 9a at the mounting portion P2 is larger than the clearance between the outer projection and the positioning recess 9a at the mounting portion P1. The outer projection 24d of the retainer bush 24 at the mounting portion P3 has a non-circular shape defined by two diametrically opposed flat sides which are parallel to each other and are interconnected at respective opposite ends by arcs, so as to correspond to the shape of the positioning recess 9a at the mounting portion P3. The clearance in the lateral direction in FIG. 5 (i.e., in a direction parallel with the straight lines or straight sides) is larger than the clearance in the vertical direction. Namely, at the mounting point P3, the retainer bush 24 is relatively movable in the direction of the length of the straight lines (straight sides) of the positioning recess 9a and is finely adjustable in the linear direction.

The set screw 6 includes a head 6a whose outer diameter is much larger than the inner diameter of the through-hole 5a of the bracket 5 and an external threaded portion 6b which is inserted in the retainer bush 24 and is screw-engaged into the threaded hole 9b.

When the bracket 5 is mounted (assembled) to the housing 9, the inner fitting portion 24c of the retainer bush 24 is inserted in the through-hole 23a of the damper bush 23, which is engaged in advance with the bracket 5, and thereafter, the outer projection 24d is fitted in the positioning recess 9a of the housing 9 so that the flange 24b abuts against the surface of the housing 9. Thereafter, a washer 26 is positioned on the end face of the damper bush on the side opposite to the flange 24 and the threaded portion 6b of the set screw 6 is inserted through the washer 26 and the retainer bush 24, and is screwed into the threaded hole 9b of the housing 9.

The difference in shape (clearance) of the outer projections 24d and of the positioning recesses 9a at the three mounting portions P1, P2 and P3 facilitates the above-mentioned mounting operation. In each of the three mounting portions P1, P2 and P3, the positioning of the damper bush 23 (bracket 5) is carried out by fitting the outer projections 24d of the retainer bushes 24 in the positioning recesses 9a of the housing 9. Hence, the positioning accuracy of the bracket 5 (motor 4) to the housing 9 is enhanced in comparison with the structure in which the set screws 6 are directly inserted and secured in the through-holes 23a of the damper bushes 23.

Figure 6:
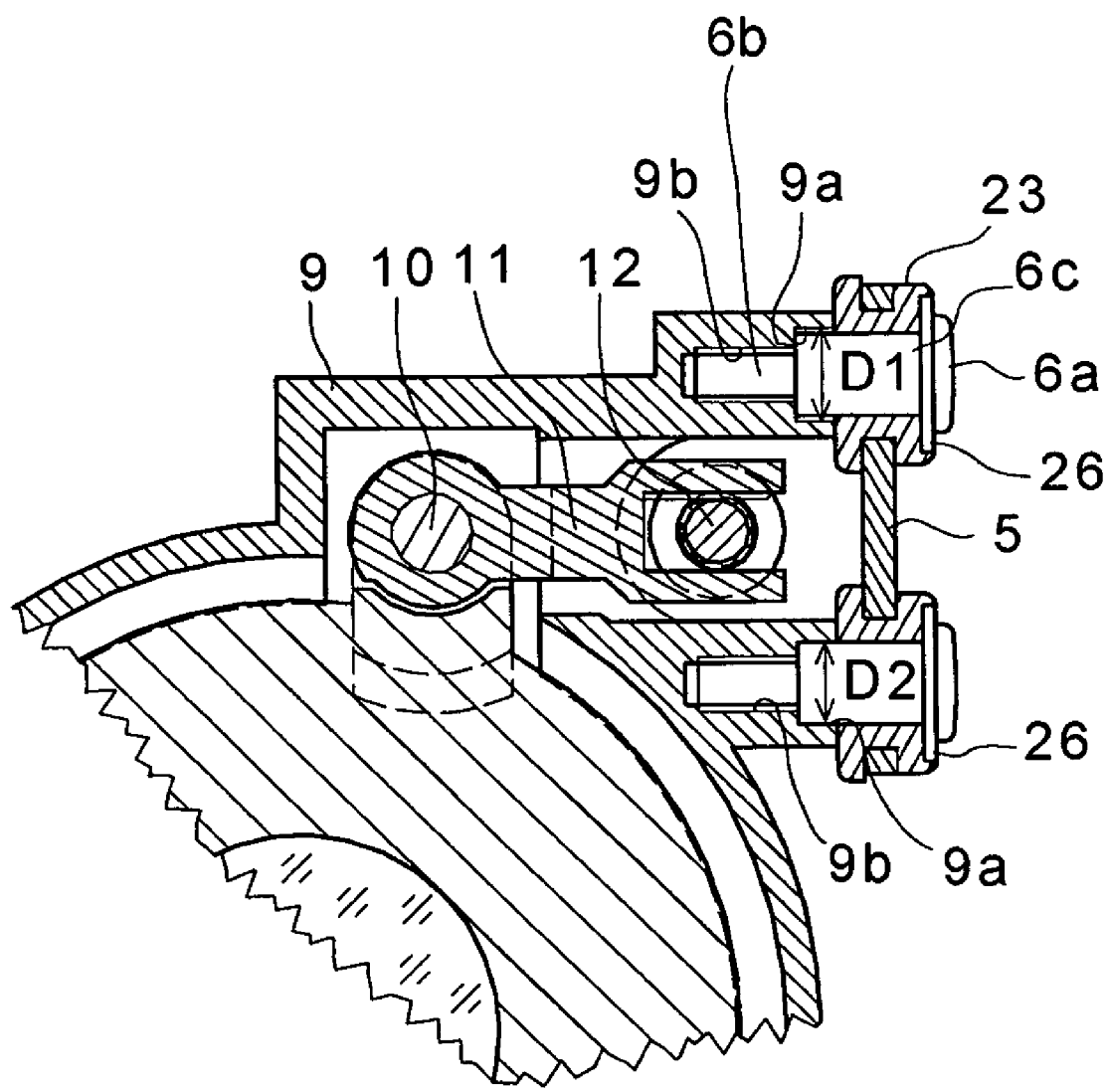
FIG. 6 is a sectional view corresponding to FIG. 3, showing a motor damping and mounting structure, according to another embodiment of the present invention.

FIG. 6 shows another embodiment of a motor damping and mounting structure of the present invention. In this embodiment, the retainer bush 24 in the first embodiment is not provided at the mounting points P1 and P2. Positioning shaft portions 6c formed on the set screws 6 are fitted in the positioning recesses (positioning cylindrical recesses) 9a of the housing 9 which is circular in cross section. Namely, the set screw 6 is provided with the positioning shaft portion 6c between the head 6*a* and the threaded portion 6*b*. The shaft portion 6*c* has a circular sectional shape having an intermediate diameter between the diameter of the head 6*a* and the diameter of the threaded portion 6*b*.

When the positioning shaft portion 6*c* is fitted in the through-hole 23*a* of the damper bush 23, the damper bush 23 is elastically deformed. The positioning shaft portion 6*c* is also fitted in the positioning recess 9*a*. Consequently, the same effects as those in the first embodiment can be expected from the second embodiment. The difference in clearance of the positioning recesses 9*a* and the positioning shaft portions 6*c* at the mounting points P1 and P2 is the same as that in the first embodiment. At the mounting point P3, the retainer bush 24, as in the first embodiment, is used so as to adjust the height. Other components in the second embodiment are the same as those in the first embodiment and are designated with like reference numerals.

Although the present invention is applied to a damping and mounting structure for a motor of a digital camera in the embodiments discussed above, the present invention can be applied to any mounting structure for mounting a motor to a housing of a device having a movable element driven by the motor.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A damping and mounting structure for a motor, comprising:
    a bracket to which a motor is mounted, said bracket being provided with a plurality of through-holes;
    a housing having a driven element which is driven by said motor on said bracket;
    a plurality of threaded holes and positioning recesses coaxial to said threaded holes, provided in said housing;
    a plurality of cylindrical damper bushes made of an elastic material, mounted in said through-holes;
    a plurality of retainer bushes made of a material harder than said damper bushes and inserted in said damper bushes, said retainer bushes being provided, at the front ends thereof, with positioning projections which are inserted into said positioning recesses;
    a plurality of set screws which extend through said retainer bushes from a surface of said bracket and are screwed into said threaded holes of said housing; and
    wherein said retainer bushes have radially extending flanges that engage a surface of said housing and a surface of a corresponding damper bush.

2. The damping and mounting structure for a motor according to claim 1, wherein each of said retainer bushes comprises:
    an outer projection, which defines said positioning projection; and
    an inner fitting portion which is fitted in a corresponding damper bush.

3. The damping and mounting structure for a motor according to claim 1, wherein a fitting clearance between one of said positioning projections and a corresponding one of said positioning recesses is different from a fitting clearance between all other said positioning projections and a corresponding all other said positioning recesses.

4. The damping and mounting structure for a motor according to claim 3, wherein said bracket is provided with three through-holes and wherein said damping and mounting structure comprises three damper bushes and three retainer bushes, the positioning projection of one of the retainer bushes at the front end thereof and the corresponding positioning recess being non-circular so as to be finely adjustable linearly in one direction without relative rotation, the remaining two retainer bushes and positioning recesses being circular in cross section, so that the fitting accuracy of one retainer bush of said remaining two retainer bushes and one positioning recess corresponding thereto is higher than that of the other retainer bush of said remaining two retainer bushes and the positioning recess corresponding thereto.

5. A damping and mounting structure for a motor, comprising:
    a bracket to which a motor is mounted, said bracket being provided with a plurality of through-holes;
    a housing having a driven element which is driven by said motor on said bracket;
    a plurality of threaded holes and positioning recesses coaxial to said threaded holes, provided in said housing;
    a plurality of cylindrical damper bushes made of an elastic material, mounted in said through-holes;
    a plurality of retainer bushes made of a material harder than said damper bushes and inserted in said damper bushes, said retainer bushes being provided, at the front ends thereof, with positioning projections which are inserted into said positioning recesses;
    a plurality of set screws which extend through said retainer bushes from a surface of said bracket and are screwed into said threaded holes of said housing;
    wherein a fitting clearance between one of said positioning projections and a corresponding one of said positioning recesses is different from a fitting clearance between all other said positioning projections and a corresponding all other said positioning recesses; and
    wherein said bracket is provided with three through-holes and wherein said damping and mounting structure further comprises three damper bushes and three retainer bushes, the positioning projection of one of the retainer bushes at the front end thereof and the corresponding positioning recess being non-circular so as to be finely adjustable linearly in one direction without relative rotation, the remaining two retainer bushes and positioning recesses being circular in cross section, so that the fitting accuracy of one retainer bush of said remaining two retainer bushes and one positioning recess corresponding thereto is higher than that of the other retainer bush of said remaining two retainer bushes and the positioning recess corresponding thereto.

* * * * *